(12) United States Patent
Kato (10) Patent No.: US 10,590,023 B2
(45) Date of Patent: Mar. 17, 2020

(54) GLASS FLAKES AND RESIN COMPOSITION

(71) Applicant: Nippon Sheet Glass Company, Limited, Tokyo (JP)

(72) Inventor: Shinichi Kato, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 135 days.

(21) Appl. No.: 15/580,602

(22) PCT Filed: Jul. 11, 2016

(86) PCT No.: PCT/JP2016/003277
§ 371 (c)(1),
(2) Date: Dec. 7, 2017

(87) PCT Pub. No.: WO2017/022181
PCT Pub. Date: Feb. 9, 2017

(65) Prior Publication Data
US 2018/0162764 A1 Jun. 14, 2018

(30) Foreign Application Priority Data
Jul. 31, 2015 (JP) .................................. 2015-151418

(51) Int. Cl.
| C03B 37/005 | (2006.01) |
| C08K 9/04 | (2006.01) |
| C08K 3/40 | (2006.01) |
| C03C 17/32 | (2006.01) |
| C08L 23/26 | (2006.01) |
(Continued)

(52) U.S. Cl.
CPC .......... *C03B 37/005* (2013.01); *C03C 17/326* (2013.01); *C03C 17/328* (2013.01); *C03C 25/10* (2013.01); *C08K 3/40* (2013.01); *C08K 9/04* (2013.01); *C08L 23/00* (2013.01);
(Continued)

(58) Field of Classification Search
CPC ................................ C03B 37/005; C08K 3/40
See application file for complete search history.

(56) References Cited

U.S. PATENT DOCUMENTS

| 3,257,184 A | 6/1966 | Glaser |
| 5,494,948 A | 2/1996 | Nishio et al. |
(Continued)

FOREIGN PATENT DOCUMENTS

| GB | 1095700 | 12/1967 |
| JP | 41017148 B | 9/1966 |
(Continued)

OTHER PUBLICATIONS

International Search Report issued for International Application No. PCT/JP2016/003277, dated Sep. 6, 2016, 3 pages including English translation.

*Primary Examiner* — Alexandre F Ferre
(74) *Attorney, Agent, or Firm* — Hamre, Schumann, Mueller & Larson, P.C.

(57) ABSTRACT

Glass flakes according to the present invention include: glass flake substrates; and a coating covering at least a portion of a surface of each of the glass flake substrates and composed of a binder. The binder includes a bismaleimide compound, a resin, and a silane coupling agent as essential components and includes a peroxide as an optional component. The proportion of the peroxide in the binder is 8 mass % or less.

13 Claims, 2 Drawing Sheets

(51) Int. Cl.
 C08L 35/02 (2006.01)
 C08L 23/00 (2006.01)
 C08L 35/00 (2006.01)
 C03C 25/10 (2018.01)
(52) U.S. Cl.
 CPC ............. *C08L 23/26* (2013.01); *C08L 35/00* (2013.01); *C08L 35/02* (2013.01)

(56) References Cited

U.S. PATENT DOCUMENTS

| | | | |
|---|---|---|---|
| 8,383,531 B2 | 2/2013 | Fujiwara et al. | |
| 2008/0124559 A1* | 5/2008 | Fujiwara | A61K 8/25 428/432 |
| 2014/0080951 A1 | 3/2014 | Raman et al. | |

FOREIGN PATENT DOCUMENTS

| | | |
|---|---|---|
| JP | 45003541 B | 2/1970 |
| JP | S5921533 A | 2/1984 |
| JP | H02124732 A | 5/1990 |
| JP | H02503669 A | 11/1990 |
| JP | H0352934 A | 3/1991 |
| JP | H0790137 A | 4/1995 |
| JP | H09227173 A | 9/1997 |
| JP | 2012207075 | 10/2012 |
| WO | 8808412 A1 | 11/1988 |
| WO | 2006068255 A1 | 6/2006 |

\* cited by examiner

GLASS FLAKES AND RESIN COMPOSITION

TECHNICAL FIELD

The present invention relates to glass flakes and a resin composition including the glass flakes.

BACKGROUND ART

For resin molded articles, it is commonly known that glass fibers, carbon fibers, mica, glass beads, glass flakes or the like are added as a filler to a matrix resin to achieve reduction in warping and deformation and/or enhancement of mechanical strength. For such a resin molded product, it has been considered preferable to surface-treat the filler with a silane coupling agent or the like to enhance the adhesion between the matrix resin and the filler and thereby further increase the mechanical strength of the resin molded article.

For example, in relation to resin molded articles whose matrix resin includes a polyolefin such as polypropylene, techniques for enhancing the adhesion between the matrix resin and a filler have been proposed. For example, Patent Literature 1 describes a technique that uses mica as a filler for polyolefin reinforcement and that includes treating the surface of the mica with an organosilane compound to enhance the adhesion between the mica and a polyolefin used as a matrix resin and adding specific compounds (a bismaleimide compound and an organic peroxide) to the matrix resin to further improve the adhesion.

CITATION LIST

Patent Literature

Patent Literature 1: JP 7(1995)-90137 A

SUMMARY OF INVENTION

Technical Problem

Conventional techniques in which the surface of a filler is treated with a silane coupling agent can indeed improve the adhesion between the filler and a matrix resin to some extent. However, the resulting adhesion is still unsatisfactory, and a further improvement has been demanded.

The technique as proposed in Patent Literature 1, in which the adhesion between a surface-treated filler and a matrix resin is further enhanced by control of the components of the entire matrix resin, has a disadvantage in that the required amount of a component incorporated for adhesion improvement may be undesirably increased because of the failure of the component to efficiently exhibit the adhesion-improving function at the interface between the filler and the matrix resin. Such a matrix resin is a resin composition which is basically intended to serve as a matrix resin; therefore, the use of the matrix resin itself as an agent for surface treatment of a filler cannot be expected to provide high effect on adhesion improvement. Furthermore, for example, the matrix resin disclosed in Patent Literature 1 is one that provides adhesion improvement when used in combination with mica. The matrix resin therefore cannot be expected to provide high effect on adhesion improvement when used in combination with a glass filler which is made of a completely different material from mica.

It is therefore an object of the present invention to provide glass flakes capable, when used as a filler for reinforcing a resin molded article, of achieving strong adhesion to a matrix resin of the resin molded article and thereby imparting high mechanical strength to the resin molded article. Another object of the present invention is to provide a resin composition that contains such glass flakes and from which a resin molded article having high mechanical strength can be obtained.

Solution to Problem

The present invention provides glass flakes including:
glass flake substrates; and
a coating covering at least a portion of a surface of each of the glass flake substrates and composed of a binder, wherein
the binder includes a bismaleimide compound, a resin, and a silane coupling agent as essential components and includes a peroxide as an optional component, and
the proportion of the peroxide in the binder is 8 mass % or less.

The present invention also provides a resin composition including the glass above flakes according to the present invention and a matrix resin.

Advantageous Effects Of Invention

The glass flakes according to the present invention are capable, when used as a filler for reinforcing a resin molded article, of achieving strong adhesion to a matrix resin of the resin molded article and thereby imparting high mechanical strength to the resin molded article. The resin composition according to the present invention, which includes such glass flakes according to the present invention, can be used to obtain a resin molded article having high mechanical strength.

DESCRIPTION OF EMBODIMENTS

Hereinafter, an embodiment of the present invention will be described in detail.

Glass flakes according to the present embodiment include: glass flake substrates; and a coating covering at least a portion of a surface of each of the glass flake substrates and composed of a binder. This binder includes a bismaleimide compound, a resin, and a silane coupling agent as essential components and includes a peroxide as an optional component. The proportion of the peroxide in the binder is 8 mass % or less. The glass flake substrates and coating will be described in more detail hereinafter.

The glass flake substrates used in the glass flakes according to the present embodiment can be produced, for example, by a so-called blow process as disclosed in JP 41(1966)-17148 B or JP 45(1970)-3541 B or by a so-called rotary process as disclosed in JP 59(1984)-21533 A or JP 2(1990)-503669 A.

Figure 1:
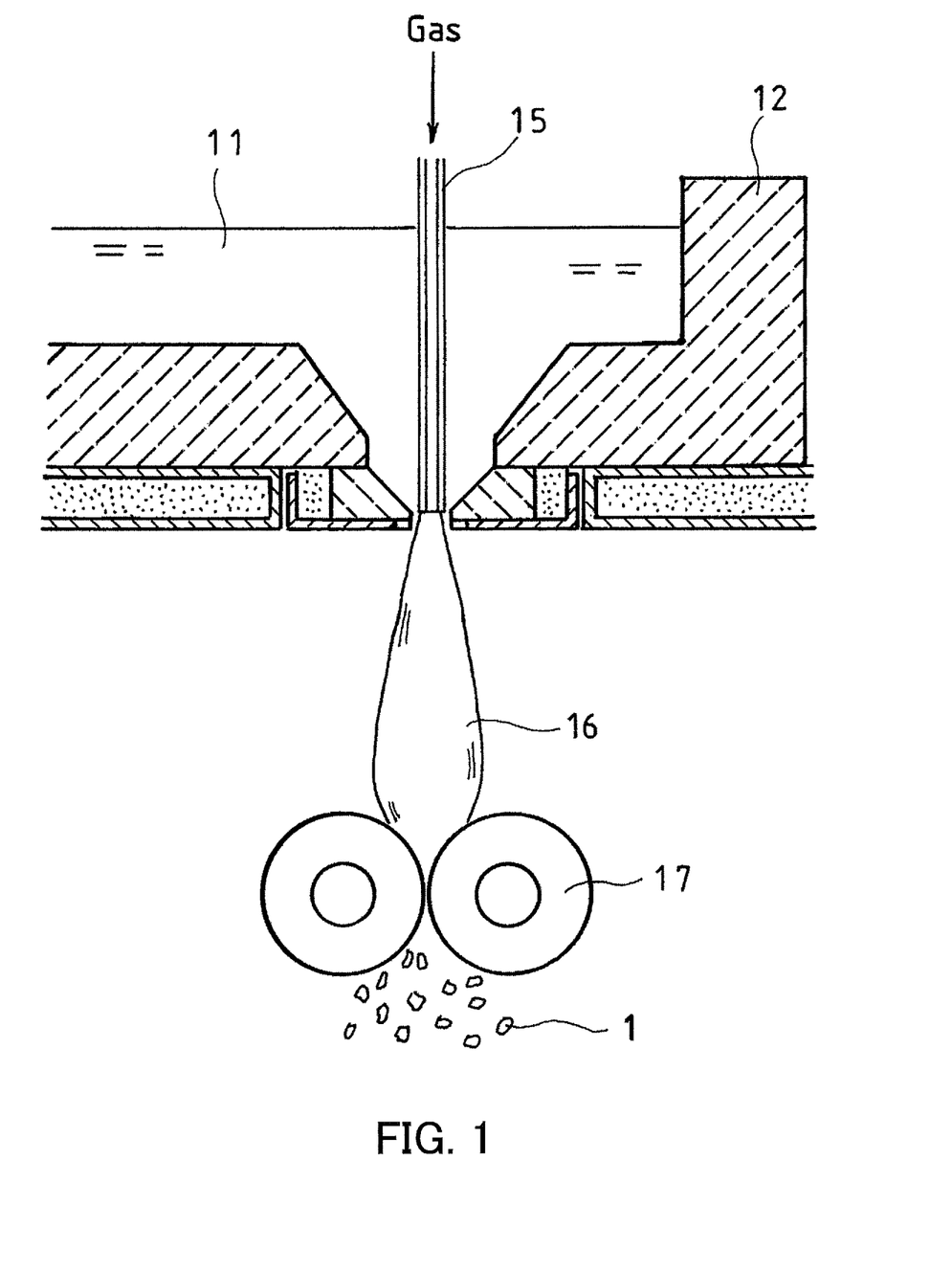
FIG. 1 is a schematic diagram illustrating an exemplary apparatus for producing glass flake substrates.

For the blow process, a glass production apparatus shown in FIG. 1 can be employed. This glass production apparatus includes a refractory tank furnace 12, a blowing nozzle 15, and pressure rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressure rolls 17 to obtain glass flake substrates 1. The thickness of the glass flake substrates 1 can be controlled by adjusting, for example, the speed of pulling the hollow glass 16 and the flow rate of the gas delivered through the blowing nozzle 15.

Figure 2:
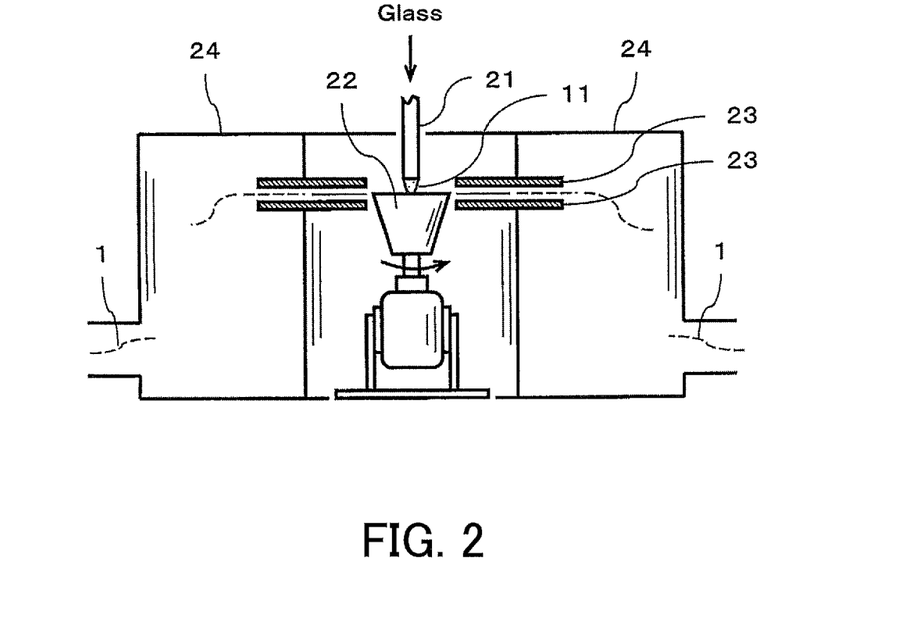
FIG. 2 is a schematic diagram illustrating another exemplary apparatus for producing glass flake substrates.

For the rotary process, a glass production apparatus shown in FIG. 2 can be employed. This glass production apparatus includes a rotary cup 22, a pair of annular plates 23, and an annular cyclone-type scavenging device 24. A molten glass raw material 11 is poured into the rotary cup 22 and is subjected to a centrifugal force, which causes the molten glass raw material 11 to radially flow out from the upper edge of the rotary cup 22. The molten glass raw material 11 is then drawn by an air stream and introduced into the annular cyclone-type scavenging device 24 through the gap between the annular plates 23. While passing through the annular plates 23, the glass cools and solidifies into a thin film, which is then crushed into fine pieces to give glass flake substrates 1. The thickness of the glass flake substrates 1 can be controlled by adjusting, for example, the distance between the annular plates 23 and the velocity of the air stream.

Commonly known glass compositions can be employed as the composition of the glass flake substrates. Specifically, glass such as E-glass which has a low content of alkali metal oxides can be suitably used. A typical composition of E-glass is shown below. In the compositions shown below, the unit of the values is mass %.

$SiO_2$: 52 to 56,
$Al_2O_3$: 12 to 16,
CaO: 16 to 25,
MgO: 0 to 6,
$Na_2O+K_2O$: 0 to 2 (preferably 0 to 0.8),
$B_2O_3$: 5 to 13, and
$F_2$: 0 to 0.5.

Another usable glass having a low content of alkali metal oxides is a glass composition containing, in mass %, $59 \leq SiO_2 \leq 65$,
$8 \leq Al_2O_3 \leq 15$,
$47 \leq (SiO_2 - Al_2O_3) \leq 57$,
$1 \leq MgO \leq 5$,
$20 \leq CaO \leq 30$,
$0 < (Li_2O + Na_2O + K_2O) < 2$, and
$0 \leq TiO_2 \leq 5$, the glass composition being substantially free of $B_2O_3$, F, ZnO, BaO, SrO, and $ZrO_2$. This glass composition is disclosed by the present applicant in WO 2006/068255 A1.

Being "substantially free" of a component means that the component is not intentionally incorporated although the component may be inevitably introduced from, for example, industrial materials. Specifically, the term "substantially free" is used to mean that the respective contents of $B_2O_3$, F, ZnO, BaO, SrO, and $ZrO_2$ are less than 0.1 mass % (preferably less than 0.05 mass %, more preferably less than 0.03 mass %).

The average thickness and average particle diameter of the glass flake substrates are not particularly limited. The thinner the glass flake substrates are, the larger the aspect ratio (a value calculated by dividing the average particle diameter by the average thickness) of the glass flake substrates is, and thus the higher the blocking effect against penetration of water or gas into a resin composition filled with the glass flakes is, but the lower the workability is. The average thickness and the average particle diameter can be selected in view of the balance among the blocking effect, the reinforcing effect on resin molded articles, the workability, the degree of technical difficulty, and the product cost effectiveness. Specifically, the use of glass flake substrates with an average thickness of 7 μm or less and an aspect ratio of 50 or more for production of the glass flakes is preferred to ensure a good balance among the blocking effect, the reinforcing effect on resin molded articles, the workability, and the product cost effectiveness. In view of the degree of technical difficulty and the product cost effectiveness, the average thickness is preferably 0.1 μm or more. To more effectively achieve the reinforcing effect on resin molded articles, the average particle diameter is preferably 10 to 2000 μm. The average aspect ratio is preferably 2000 or less in view of the dispersibility in resins. The average thickness of the glass flake substrates, as described herein, refers to a value determined by extracting 100 or more of the glass flake substrates, measuring the thickness of the 100 or more glass flake substrates with a scanning electron microscope (SEM), and dividing the sum of the measured thickness values by the number of the glass flake substrates whose thickness has been measured. The average particle diameter as described herein refers to a particle diameter (D50) at a cumulative mass percentage of 50% in a particle size distribution measured by a laser diffraction-scattering method.

As previously mentioned, the binder for forming the coating contains a bismaleimide compound, a resin, and a silane coupling agent as essential components.

The bismaleimide compound functions as a crosslinking agent. As the bismaleimide compound there is suitably used 4,4'-methylene diphenyl bismaleimide. Other examples of bismaleimide compounds that can be used include m-phenylene bismaleimide, 4-methyl-m-phenylene bismaleimide, 4,4'-ethylene diphenyl bismaleimide, and 4,4'-vinylene diphenyl bismaleimide.

As the resin there can be used, for example, an epoxy-modified polyolefin resin, an epoxy resin, or a polyurethane resin. When the glass flakes are mixed with a matrix resin to form a resin composition, it is desirable that the resin contained in the binder for forming the coating be appropriately selected according to the type of the matrix resin to achieve stronger adhesion between the glass flakes and the matrix resin. When, for example, a polyolefin is used as the matrix resin, an epoxy-modified polyolefin resin is suitably used as the resin contained in the binder for forming the coating. When, for example, a thermoplastic polyester resin is used as the matrix resin, an epoxy resin is suitably used as the resin contained in the binder for forming the coating.

The epoxy-modified polyolefin resin is preferably a polyolefin-glycidyl methacrylate copolymer, a polyolefin-allyl glycidyl ether copolymer, and/or a copolymer composed of a polyolefin on which glycidyl methacrylate or allyl glycidyl ether has been grafted under action of an organic peroxide. An ethylene-glycidyl methacrylate copolymer (in particular, an ethylene-glycidyl methacrylate graft copolymer) including ethylene and glycidyl methacrylate as essential components is suitably used as the epoxy-modified polyolefin resin. However, the epoxy-modified polyolefin resin is not limited to the above copolymers, and other examples of resins that can be used include an ethylene-vinyl acetate-glycidyl methacrylate copolymer, an ethylene-methyl acrylate-glycidyl methacrylate copolymer, an ethylene-ethyl acrylate-glycidyl methacrylate copolymer, an ethylene-butyl acrylate-glycidyl methacrylate copolymer, an ethylene-acrylic acid-acrylic acid ester-glycidyl methacrylate copolymer, an ethylene-methacrylic acid ester-glycidyl methacrylate copolymer, an ethylene-methacrylic acid-methacrylic acid ester copolymer-glycidyl methacrylate copolymer, an ethylene-polypropylene copolymer-glycidyl methacrylate graft copolymer, an ethylene-vinyl acetate copolymer-glycidyl methacrylate graft copolymer, a polypropylene-glycidyl methacrylate copolymer, and a polypropylene-glycidyl methacrylate graft copolymer.

Examples of the silane coupling agent include γ-aminopropyltriethoxysilane, γ-aminopropyltrimethoxysilane, γ-ureidopropyltriethoxysilane, γ-glycidoxypropyltrimethoxysilane, vinyltriethoxysilane, and γ-methacryloxypropyltrimethoxysilane. Among these, γ-aminopropyltriethoxysilane, γ-aminopropyltrimethoxysilane, and γ-ureidopropyltriethoxysilane are suitably used. A titanium coupling agent, an aluminum coupling agent, or a zirconia coupling agent can be used in addition to the silane coupling agent.

In the binder, the ratio between the total mass of the silane coupling agent and the resin and the mass of the bismaleimide compound (silane coupling agent+resin: bismaleimide compound), as expressed by a mass ratio between solids exclusive of water and solvents, is, for example, 1:99 to 90:10, preferably 30:70 to 85:15, and more preferably 50:50 to 80:20.

The binder may, if necessary, include another component in addition to the bismaleimide compound, the resin, and the silane coupling agent. For example, the binder may, if necessary, include another component such as an epoxy resin, a urethane resin, a surfactant, and/or an anti-foaming agent in addition to the components described above. When the binder further includes a peroxide as a crosslinking agent, namely, when the bismaleimide compound and the peroxide are used in combination as crosslinking agents, increasing the content of the peroxide in the binder above a certain level will make it difficult to achieve high reinforcing effect of the glass flakes according to the present embodiment on resin molded articles. Thus, the binder is free of any peroxide or, if the binder contains a peroxide, the proportion of the peroxide in the binder is controlled to 8 mass % or less.

The method for producing the binder is not particularly limited. For example, a dispersion prepared by uniformly dispersing a resin with the aid of an emulsifier or the like is mixed with a hydrolyzed silane coupling agent and a bismaleimide compound, and the mixture is used as a solution containing the binder (binder solution). Alternatively, the binder solution can be produced by adding the resin, the silane coupling agent, the bismaleimide compound etc. to an organic solvent at ordinary temperature and atmospheric pressure and then by stirring the mixture to homogeneity.

In the present embodiment, for example, the binder solution is added to the glass flake substrates, which are stirred and then dried to form a coating covering at least a portion of the surface of each of the glass flake substrates. The method for accomplishing the addition of the binder solution, the stirring, and the drying is not limited to specific ones. Examples of the method will now be described.

For example, the glass flake substrates are fluidized in a mixer such as a rotary disk mixer or Henschel mixer having a mixing vessel equipped with a rotating blade, a predetermined amount of the binder is added to the flowing glass flake substrates by a means such as a spray, and the glass flake substrates and the binder are mixed and stirred. Next, the glass flake substrates are dried under stirring in the mixer, or the glass flake substrates are taken out of the mixer and dried. With this method, glass flakes provided with a coating can be obtained.

In another example, the glass flakes can be produced by tumbling granulation as described in JP 2(1990)-124732 A.

That is, the glass flakes can be produced by placing the glass flake substrates in a horizontal vibrating granulator equipped with a stirring blade, spraying the binder solution onto the glass flake substrates, and performing granulation.

The glass flakes can be produced also by using known methods other than the above examples, such as methods generally called stirring granulation, fluidized bed granulation, injection granulation, and rotary granulation.

The drying step is accomplished, for example, by heating the glass flake substrates to a temperature equal to or higher than the boiling point of the solvent used in the binder solution and drying the glass flake substrates until the solvent fully evaporates.

The proportion of the coating in the glass flakes can be controlled by adjusting the concentration of the binder in the binder solution to be added or sprayed. That is, the glass flakes having a predetermined proportion of the coating composed of the binder can be produced by adding or spraying a predetermined amount of the binder solution onto a predetermined amount of the glass flake substrates so that a predetermined amount of the binder is deposited on the glass flake substrates.

The proportion of the coating in the glass flakes is, for example, 0.1 to 3 mass %, desirably 0.2 to 1.8 mass %, and more desirably 0.4 to 1.0 mass %. If the proportion of the coating is less than 0.1 mass %, covering of the glass flake substrates by the binder may be insufficient, and the insufficient covering can cause a decrease in the strength of the resulting resin molded article. If the proportion of the coating is more than 3 mass %, extrusion molding may involve generation of a gas which causes problems such as fouling of the mold or discoloration of the resulting resin molded article. Additionally, if the proportion of the coating is more than 3 mass %, the binding force between the glass flakes themselves may be so increased that insufficient kneading during resin molding can cause the glass flakes to remain as aggregates in the resulting resin molded article, thus leading to a decrease in the strength of the resin molded article. Further, if the proportion of the coating is more than 3 mass %, the components of the excess coating may impair the adhesion between the glass flakes and the matrix resin and thus cause a failure to achieve good properties of the resulting molded article.

Next, a resin composition according to the present embodiment will be described.

The resin composition according to the present embodiment includes the above-described glass flakes according to the present embodiment and a matrix resin.

The matrix resin is not particularly limited, and examples thereof include: polyolefins such as polybutylene, polypropylene, and polyethylene; polyesters such as thermoplastic polyester resins typified by polybutylene terephthalate; polycarbonate; polyvinyl chloride; polystyrene; polyamide; copolymers thereof, polyphenylene sulfide; polyphenylene ether; polyetheretherketone; and liquid-crystal polymers (including types I, II, and III). The glass flakes according to the present embodiment can exhibit high reinforcing effect on a resin molded article especially when a polyolefin, thermoplastic polyester resin, or polycarbonate is used as the matrix resin. In particular, when the polyolefin used is polypropylene or the thermoplastic polyester resin used is polybutylene terephthalate, the glass flakes according to the present embodiment can exhibit higher reinforcing effect.

The content of the glass flakes in the resin composition is preferably 5 to 70 mass %. Controlling the content to 5 mass % or more allows the glass flakes to fully exhibit their function as a reinforcing material. Controlling the content to 70 mass % or less allows the glass flakes to be uniformly dispersed in the resin composition. The content of the glass flakes is more preferably controlled to 30 mass % or more and 60 mass % or less to reduce the molding shrinkage.

The resin composition may, depending on its intended use, contain a reinforcing material other than the glass flakes, such as glass fibers. For example, when the resin composition is used in a part of an electric or electronic device, the resin composition may contain glass fibers in an amount comparable to that of the glass flakes since such a part needs to have very high strength.

A resin molded article produced using the resin composition according to the present embodiment can have high tensile strength and high flexural strength by virtue of the reinforcing effect of the glass flakes. Additionally, the molding shrinkage of the resin composition according to the present embodiment is low, and a resin molded article having high dimensional stability can thus be obtained using the resin composition. Further, since the glass flakes contained in the resin composition according to the present embodiment have a smaller average thickness than glass flakes contained in conventional resin compositions, a resin molded article having a smooth surface with small surface roughness can be obtained using the resin composition according to the present embodiment.

EXAMPLES

Hereinafter, the embodiment of the present invention will be described in more detail with Examples and Comparative Examples.

Example 1

(Glass Flakes)

First, E-glass having a composition shown in Table 1 was used to produce glass flake substrates by a blow process as described with reference to FIG. 1. Specifically, the E-glass was placed and melted in a melting furnace heated to 1200° C. or higher. Air was blown from a nozzle into the molten glass to form thin glass, and this thin glass was continuously pulled out by rollers. The amount of the blown air and the rotation speed of the rollers were controlled to give glass with an average thickness of 0.7 μm. Afterwards, the glass was crushed, and the crushed glass was classified to give glass flake substrates having an average particle diameter of 160 μm. Glass flake substrates with a uniform size can be obtained by crushing into glass flake substrates, followed by classification of the glass flake substrates by means of a sieve having an appropriate opening size.

TABLE 1

| | (Unit: mass %) E-glass |
|---|---|
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $B_2O_3$ | 5.8 |
| Other components | 1.2 |

Next, 5 kg of the glass flake substrates were placed in a Henschel mixer, and a binder solution was added using a spray. While the binder solution was being added, the substrates and solution were mixed and stirred for 15 minutes. In the binder (solid) contained in the binder solution, the content of the silane coupling agent component was 45 parts by mass, the content of the resin component was 45 parts by mass, and the content of the crosslinking agent component was 10 parts by mass. The silane coupling agent component used was γ-aminopropyltriethoxysilane, the resin component used was an ethylene-glycidyl methacrylate graft copolymer (glycidyl methacrylate content: about 15 mass %), and the bismaleimide compound used as the crosslinking agent was 4,4'-methylene diphenyl bismaleimide. The solvent used in the binder solution was water. After the stirring, glass flakes (undried) were taken out of the mixer and dried by a dryer at 125° C. for 8 hours. Glass flakes of Example 1 were thus obtained.

The proportion of the deposited binder in the obtained glass flakes was examined by loss on ignition. Specifically, a proper amount of the glass flakes were dried at 110° C. and then heated in an atmosphere at 625° C. to remove the binder from the surface of the glass flakes. The proportion of the deposited binder in the glass flakes was calculated from the difference between the mass of the glass flakes before the heating and the mass of the glass flakes after the heating. The result is shown in Table 2. In Table 2, the ethylene-glycidyl methacrylate graft copolymer is denoted as "PE-GMA".

(Resin Molded Article)

The glass flakes of Example 1 and polypropylene (NOVATEC BC06C, manufactured by Japan Polypropylene Corporation) were kneaded by an extrusion molding machine (KZW15-30MG, manufactured by Technovel Corporation; molding temperature=about 210 to 220° C.) to obtain a resin composition including polypropylene as a matrix resin and glass flakes as a reinforcing filler. This resin composition was molded by an injection molding machine (HM7, manufactured by Nissei Plastic Industrial Co., Ltd.) to obtain a resin molded article. The content of the glass flakes in the obtained resin molded article was 30 mass %.

The properties of the resin molded article were examined. The maximum tensile strength, tensile modulus, and tensile strain were measured according to JIS K 7113. The maximum flexural strength, flexural modulus, and flexural strain were measured according to JIS K 7171. The Izod impact strength was measured according to JIS K 7111-1. The measurement results are shown in Table 2.

Examples 2 to 6

Glass flakes of Examples 2 and 6 were produced in the same manner as in Example 1, except that the ratio among the bismaleimide compound, the resin, and the silane coupling agent in the binder contained in the binder solution was changed as shown in Table 2. As in Example 1, 4,4'-methylene diphenyl bismaleimide was used as the bismaleimide compound, an ethylene-glycidyl methacrylate graft copolymer (glycidyl methacrylate content: about 15 mass %) was used as the resin, and γ-aminopropyltriethoxysilane was used as the silane coupling agent. The proportion of the coating in the obtained glass flakes was measured in the same manner as in Example 1. Resin molded articles were also produced and their various properties were measured in the same manner as in Example 1. The results are shown in Table 2.

Examples 7 and 8

Glass flakes of Examples 7 and 8 were produced in the same manner as in Example 4, except for changing the resin from the ethylene-glycidyl methacrylate graft copolymer to an acid-modified polypropylene resin (Hitec P-9018, manufactured by Toho Chemical Industry Co., Ltd. and referred to as "Modified PP" in Table 2) or to a urethane resin (Impranil DLC-F, manufactured by Sumitomo Bayer Urethane Co., Ltd. and referred to as "Urethane" in Table 2). The proportion of the coating in the obtained glass flakes was measured in the same manner as in Example 1. Resin molded articles were also produced and their various properties were measured in the same manner as in Example 1. The results are shown in Table 2.

Example 9

Glass flakes of Example 9 were produced in the same manner as in Example 1, except for further adding a peroxide as a crosslinking agent to the binder. The peroxide used in Example 9 was tert-butyl hydroperoxide. In the binder of the glass flakes of Example 9, the ratio among the bismaleimide compound, the silane coupling agent, the resin, and the peroxide was as shown in Table 2. The proportion of the coating in the obtained glass flakes was measured in the same manner as in Example 1. A resin molded article was also produced and its various properties were measured in the same manner as in Example 1. The results are shown in Table 2.

Comparative Example 1

Glass flakes of Comparative Example 1 were produced in the same manner as in Example 1, except for not adding any bismaleimide compound to the binder. It should be noted, for the glass flakes of Comparative Example 1, that the ratio between the resin and the silane coupling agent in the binder was as shown in Table 2. As in Example 1, an ethylene-glycidyl methacrylate graft copolymer (glycidyl methacrylate content: about 15 mass %) was used as the resin, and γ-aminopropyltriethoxysilane was used as the silane coupling agent. The proportion of the coating in the obtained glass flakes was measured in the same manner as in Example 1. A resin molded article was also produced and its various properties were measured in the same manner as in Example 1. The results are shown in Table 2.

Comparative Example 2

Glass flakes of Comparative Example 2 were produced in the same manner as in Example 1, except for not adding any bismaleimide compound or silane coupling agent to the binder. That is, the binder in Comparative Example 2 consisted of an ethylene-glycidyl methacrylate graft copolymer (glycidyl methacrylate content: about 15 mass %) used as the resin. The proportion of the coating in the obtained glass flakes was measured in the same manner as in Example 1. A resin molded article was also produced and its various properties were measured in the same manner as in Example 1. The results are shown in Table 2.

Comparative Example 3

Glass flakes of Comparative Example 3 were produced in the same manner as in Example 1, except for not adding any silane coupling agent or resin to the binder. That is, the binder in Comparative Example 3 consisted of 4,4'-methylene diphenyl bismaleimide used as the bismaleimide compound. The proportion of the coating in the obtained glass flakes was measured in the same manner as in Example 1.

A resin molded article was also produced and its various properties were measured in the same manner as in Example 1. The results are shown in Table 2.

Comparative Example 4

Glass flakes of Comparative Example 4 were produced in the same manner as in Example 1, except for not adding any resin to the binder. It should be noted, for the glass flakes of Comparative Example 4, that the ratio between the bismaleimide compound and the silane coupling agent in the binder was as shown in Table 2. As in Example 1, 4,4'-methylene diphenyl bismaleimide was used as the bismaleimide compound, and γ-aminopropyltriethoxysilane was used as the silane coupling agent. The proportion of the coating in the obtained glass flakes was measured in the same manner as in Example 1. A resin molded article was also produced and its various properties were measured in the same manner as in Example 1. The results are shown in Table 2.

Comparative Example 5

Glass flakes of Comparative Example 5 were produced in the same manner as in Example 1, except for further adding a peroxide as a crosslinking agent to the binder. The peroxide used in Comparative Example 5 was tert-butyl hydroperoxide. It should be noted, for the glass flakes of Comparative Example 5, that the ratio among the bismaleimide compound, the silane coupling agent, the resin, and the peroxide in the binder was as shown in Table 2. As in Example 1, 4,4'-methylene diphenyl bismaleimide was used as the bismaleimide compound, γ-aminopropyltriethoxysilane was used as the silane coupling agent, and an ethylene-glycidyl methacrylate graft copolymer (glycidyl methacrylate content: about 15 mass %) was used as the epoxy-modified polyolefin resin. The proportion of the coating in the obtained glass flakes was measured in the same manner as in Example 1. A resin molded article was also produced and its various properties were measured in the same manner as in Example 1. The results are shown in Table 2.

Example 10

Glass flakes of Example 10 were produced in the same manner as in Example 1, except for changing the resin from the ethylene-glycidyl methacrylate graft copolymer to an epoxy resin (Epolsion EA10, manufactured by Henkel Japan Ltd.). It should be noted, for the glass flakes of Example 10, that the ratio among the bismaleimide compound, the silane coupling agent, and the epoxy resin in the binder was as shown in Table 3. The proportion of the coating in the obtained glass flakes was measured in the same manner as in Example 1. A resin molded article of Example 10 was also produced in the same manner as in Example 1, except for using polybutylene terephthalate (DURANEX 2000, manufactured by WinTech Polymer Ltd.) as the matrix resin. The various properties of the resin molded article of Example 10 were measured in the same manner as in Example 1. The term "moist heating" in Table 3 is used to mean that the strength of the specimen was measured after it was placed at 85° C. and 85 RH % for the indicated days.

Comparative Example 6

Glass flakes of Comparative Example 6 were produced in the same manner as in Example 10, except for not adding any bismaleimide compound to the binder. It should be noted, for the glass flakes of Comparative Example 6, that the ratio between the silane coupling agent and the epoxy resin in the binder was as shown in Table 3. A resin molded article was also produced and its various properties were measured in the same manner as in Example 10. The results are shown in Table 3.

As seen from Table 2, the resin molded articles of Examples 1 to 9 exhibited better, more well-balanced mechanical strength properties than the resin molded articles of Comparative Examples 1 and 2 where the binder contained no bismaleimide compound, the resin molded article of Comparative Example 3 where the binder consisted only of a bismaleimide compound, and the resin molded article of Comparative Example 4 where the binder consisted only of a bismaleimide compound and a coupling agent. The resin molded article of Comparative Example 4 had very low levels of tensile strength and flexural strength, although it exhibited high impact strength. Comparison of the results in Examples 4, 7, and 8 reveals that an epoxy-modified polyolefin is suitable as the resin used in the binder when the matrix resin is polypropylene. Comparative Example 5, where a bismaleimide compound and a peroxide were used in combination as crosslinking agents and the proportion of the peroxide in the binder was more than 8 mass %, showed no improvement in mechanical strength properties as compared to Example 2 where the ratio among the components in the binder was similar to that in Comparative Example 5. The resin composition of Example 9, where a bismaleimide compound and a peroxide were used in combination and the proportion of the peroxide in the binder was 8 mass % or less, exhibited high mechanical strength.

The content of the glass flakes in the resin molded article was the same (30 mass %) for all of Examples and Comparative Examples. This leads to the conclusion that a binder including a silane coupling agent, a resin, and a bismaleimide compound can correlate with the strength of a resin including polypropylene. That is, the use of a binder including a coupling agent, a resin, and a bismaleimide compound for a coating of glass flakes can improve the mechanical properties of a resin molded article reinforced by the glass flakes.

Examples 11 and 12

Glass flakes of Examples 11 and 12 were produced in the same manner as in Example 10, except for changing the ratio among the bismaleimide compound, the silane coupling agent, and the epoxy resin in the binder as shown in Table 4. The proportion of the coating in the obtained glass flakes was measured in the same manner as in Example 1. Resin molded articles of Examples 11 and 12 were also produced in the same manner as in Example 1, except for using a polycarbonate (Iupilon S3000 F, manufactured by Mitsubishi Engineering-Plastics Corporation) as the matrix resin, and their various properties were measured. The results are shown in Table 4.

Comparative Example 7

Glass flakes of Comparative Example 7 were produced in the same manner as in Example 11, except for not adding any bismaleimide compound to the binder. It should be noted, for the glass flakes of Comparative Example 7, that the ratio between the silane coupling agent and the epoxy resin in the binder was as shown in Table 4. A resin molded article was also produced and its various properties were measured in the same manner as in Example 11. The results are shown in Table 4.

TABLE 2

|  |  | Examples ||||||| 
|---|---|---|---|---|---|---|---|---|
|  |  | 1 | 2 | 3 | 4 | 5 | 6 | 7 |
| (Binder) | Proportion of coating mass %) | 0.5 | 0.5 | 0.5 | 0.5 | 0.5 | 0.5 | 0.5 |
|  | Type of resin | PE-GMA | PE-GMA | PE-GMA | PE-GMA | PE-GMA | PE-GMA | Modified PP |
|  | Bismaleimide compound content (mass %) | 10 | 25 | 37.5 | 50 | 70 | 90 | 50 |
|  | Coupling agent content (mass %) | 45 | 37.5 | 31.25 | 25 | 15 | 5 | 25 |
|  | Resin content (mass %) | 45 | 37.5 | 31.25 | 25 | 15 | 5 | 25 |
|  | Peroxide content (mass %) | 0 | 0 | 0 | 0 | 0 | 0 | 0 |
| Properties of molded article | Maximum tensile strength (MPa) | 44.3 | 44.7 | 45.2 | 45.9 | 46.7 | 44.5 | 43.9 |
|  | Tensile modulus (MPa) | 1910 | 1949 | 1968 | 1971 | 1993 | 1915 | 1907 |
|  | Tensile strain (%) | 2.9 | 3.0 | 3.3 | 3.5 | 3.7 | 3.4 | 3.2 |
|  | Maximum flexural strength (MPa) | 90.5 | 91.7 | 93.7 | 94.0 | 94.8 | 90.2 | 92.1 |
|  | Flexural modulus (MPa) | 4501 | 4775 | 4740 | 4753 | 4766 | 3917 | 3924 |
|  | Flexural strain (%) | 3.1 | 3.2 | 3.4 | 3.4 | 3.5 | 3.2 | 4.6 |
|  | Izod impact strength UN*[1] (kJ/m$^2$) | 23.5 | 24.3 | 25.9 | 28.2 | 29.9 | 31.1 | 27.3 |
|  | Izod impact strength N*[2] (kJ/m$^2$) | 2.4 | 2.4 | 2.5 | 2.9 | 3.2 | 3.5 | 2.8 |

|  |  | Examples || Comparative Examples ||||| 
|---|---|---|---|---|---|---|---|---|
|  |  | 8 | 9 | 1 | 2 | 3 | 4 | 5 |
| (Binder) | Proportion of coating mass %) | 0.5 | 0.5 | 0.5 | 0.5 | 0.5 | 0.5 | 0.5 |
|  | Type of resin | Urethane | PE-GMA | PE-GMA | PE-GMA | — | — | PE-GMA |
|  | Bismaleimide compound content (mass %) | 50 | 25 | 0 | 0 | 100 | 50 | 25 |
|  | Coupling agent content (mass %) | 25 | 35 | 50 | 0 | 0 | 50 | 32.5 |
|  | Resin content (mass %) | 25 | 35 | 50 | 100 | 0 | 0 | 32.5 |
|  | Peroxide content (mass %) | 0 | 5 | 0 | 0 | 0 | 0 | 10 |
| Properties of molded | Maximum tensile strength (MPa) | 43.7 | 43.6 | 43.3 | 41.8 | 43.0 | 39.9 | 43.1 |
|  | Tensile modulus (MPa) | 1901 | 1910 | 1898 | 1551 | 1870 | 1687 | 1694 |

TABLE 2-continued

| article | | | | | | | | |
|---|---|---|---|---|---|---|---|---|
| | Tensile strain (%) | 3.2 | 3.0 | 2.8 | 2.5 | 2.9 | 2.3 | 2.9 |
| | Maximum flexural strength (MPa) | 92.8 | 90.5 | 90.1 | 85.0 | 86.8 | 71.4 | 87.1 |
| | Flexural modulus (MPa) | 4096 | 4010 | 4469 | 3977 | 3802 | 3177 | 4012 |
| | Flexural strain (%) | 4.3 | 3.2 | 3.1 | 3.0 | 3.0 | 2.3 | 3.1 |
| | Izod impact strength UN[*1] (kJ/m$^2$) | 26.0 | 24.7 | 21.6 | 19.9 | 23.5 | 27.1 | 23.3 |
| | Izod impact strength N[*2] (kJ/m$^2$) | 2.7 | 2.5 | 1.9 | 1.1 | 2.4 | 3.9 | 1.8 |

Notes
[*1] Unnotched
[*2] Notched

TABLE 3

| | | | Example 10 | Comparative Example 6 |
|---|---|---|---|---|
| Proportion of coating (mass %) | | (mass %) | 0.5 | 0.5 |
| Binder | Bismaleimide compound content | (mass %) | 12.5 | 0 |
| | Coupling agent content | (mass %) | 50 | 50 |
| | Epoxy resin content | (mass %) | 37.5 | 50 |
| Properties of molded article | Maximum tensile strength-initial | (MPa) | 75.8 | 77.7 |
| | Tensile modulus-initial | (MPa) | 2080 | 2378 |
| | Tensile strain-initial | (%) | 3.7 | 3.9 |
| | Maximum tensile strength-moist heating (two days) | (MPa) | 68.3 | 70.4 |
| | Tensile strain-moist heating (two days) | (MPa) | 2502 | 2510 |
| | Tensile strain-moist heating (two days) | (%) | 3.3 | 3.7 |
| | Maximum tensile strength-moist heating (five days) | (MPa) | 66 | 68.4 |
| | Tensile modulus-moist heating (five days) | (MPa) | 2340 | 2737 |
| | Tensile strain-moist heating (five days) | (%) | 3.3 | 3.5 |
| | Maximum flexural strength-initial | (MPa) | 146.1 | 147.8 |
| | Flexural modulus-initial | (MPa) | 7446 | 7969 |
| | Flexural strain-initial | (%) | 2.8 | 2.9 |
| | Maximum flexural strength-moist heating (two days) | (MPa) | 129.2 | 138.4 |
| | Flexural modulus-moist heating (two days) | (MPa) | 6683 | 6765 |
| | Flexural strain-moist heating (two days) | (%) | 3.1 | 3.2 |
| | Maximum flexural strength-moist heating (five days) | (MPa) | 122.7 | 134.7 |
| | Flexural modulus-moist heating (five days) | (MPa) | 6309 | 6725 |
| | Flexural strain-moist heating (five days) | (%) | 2.9 | 3.1 |
| | Izod impact strength UN[*1] | (kJ/m$^2$) | 33.5 | 41.3 |
| | Izod impact strength N[*2] | (kJ/m$^2$) | 2.7 | 3.3 |

Notes
[*1] Unnotched
[*2] Notched

TABLE 4

| | | | Example 11 | Example 12 | Comparative Example 7 |
|---|---|---|---|---|---|
| Proportion of deposited binder | | (mass %) | 0.5 | 0.5 | 0.5 |
| Binder | Bismaleimide compound content | (mass %) | 25 | 50 | 0 |
| | Coupling agent content | (mass %) | 25 | 25 | 25 |
| | Epoxy resin content | (mass %) | 50 | 25 | 75 |
| Properties | Maximum tensile strength | (MPa) | 72.2 | 73.8 | 71.1 |

TABLE 4-continued

|  |  |  | Example 11 | Example 12 | Comparative Example 7 |
|---|---|---|---|---|---|
| of molded article | Tensile modulus | (MPa) | 4343 | 4635 | 4219 |
|  | Tensile strain | (%) | 2.1 | 2.3 | 2.0 |
|  | Maximum flexural strength | (MPa) | 131.1 | 134.6 | 129.0 |
|  | Flexural modulus | (MPa) | 6993 | 7132 | 6935 |
|  | Flexural strain | (%) | 2.6 | 2.8 | 2.5 |
|  | Izod impact strength UN[*1] | (kJ/m$^2$) | 25.5 | 26.3 | 25.2 |
|  | Izod impact strength N[*2] | (kJ/m$^2$) | 2.7 | 2.8 | 2.6 |

Notes
[*1]Unnotched
[*2]Notched

INDUSTRIAL APPLICABILITY

The glass flakes according to the present invention are capable of effectively reinforcing resin molded articles as well as being effective in reducing warping and shrinkability of the resin molded articles, and are therefore applicable to various uses. For example, a resin composition including the glass flakes according to the present invention and polypropylene can be suitably used, for example, in the field of automobiles and in the field of electronic parts.

The invention claimed is:

1. Glass flakes comprising:
   glass flake substrates; and
   a coating covering at least a portion of a surface of each of the glass flake substrates and composed of a binder, wherein
   the binder comprises a bismaleimide compound, a resin, and a silane coupling agent as essential components and comprises a peroxide as an optional component,
   the proportion of the peroxide in the binder is 8 mass % or less, and
   the bismaleimide compound is at least one selected from the group consisting of 4,4'-methylene diphenyl bismaleimide, m-phenylene bismaleimide, 4-methyl-m-phenylene bismaleimide, 4,4'-ethylene diphenyl bismaleimide, and 4,4'-vinylene diphenyl bismaleimide.

2. The glass flakes according to claim 1, wherein the bismaleimide compound is 4,4'-methylene diphenyl bismaleimide.

3. The glass flakes according to claim 1, wherein the resin is an epoxy-modified polyolefin resin.

4. The glass flakes according to claim 1, wherein the resin is an epoxy resin.

5. The glass flakes according to claim 1, wherein the silane coupling agent is γ-aminopropyltriethoxysilane.

6. The glass flakes according to claim 1, wherein the proportion of the coating in the glass flakes is 0.1 to 3 mass %.

7. The glass flakes according to claim 1, wherein the glass flake substrates have an average thickness of 0.1 to 7 μm and an average particle diameter of 10 to 2000 μm.

8. A resin composition comprising: the glass flakes according to claim 1; and a matrix resin.

9. The resin composition according to claim 8, wherein the matrix resin is a polyolefin, a thermoplastic polyester resin, or a polycarbonate.

10. The resin composition according to claim 9, wherein the matrix resin is the polyolefin, and wherein the resin of the binder is an epoxy-modified polyolefin resin.

11. The resin composition according to claim 9, wherein the polyolefin is polypropylene.

12. The resin composition according to claim 9, wherein the matrix resin is the thermoplastic polyester resin, and wherein the resin is an epoxy resin.

13. The resin composition according to claim 9, wherein the thermoplastic polyester resin is polybutylene terephthalate.

* * * * *

UNITED STATES PATENT AND TRADEMARK OFFICE
CERTIFICATE OF CORRECTION

PATENT NO. : 10,590,023 B2  
APPLICATION NO. : 15/580602  
DATED : March 17, 2020  
INVENTOR(S) : Kato Page 1 of 1

It is certified that error appears in the above-identified patent and that said Letters Patent is hereby corrected as shown below:

In the Specification

Columns 11-12, in "Table 2", Line 1, delete "mass %)" and insert -- (mass%) --.

Columns 11-12, in "Table 2", Line 1, delete "(Binder" and insert -- Binder --.

Columns 11-12, in "Table 2" (2nd Part), Line 1, delete "mass %)" and insert -- (mass%) --.

Columns 11-12, in "Table 2" (2nd Part), Line 1, delete "(Binder" and insert -- Binder --.

Signed and Sealed this  
Twenty-eighth Day of July, 2020

Andrei Iancu  
*Director of the United States Patent and Trademark Office*